United States Patent
Sodhi et al.

(10) Patent No.: US 7,451,549 B1
(45) Date of Patent: Nov. 18, 2008

(54) AUTOMATIC CALIBRATION OF A THREE-AXIS MAGNETIC COMPASS

(75) Inventors: Raj Sodhi, Santa Rosa, CA (US); Jay Prunty, Santa Rosa, CA (US); George Hsu, Santa Rosa, CA (US); Becky Oh, Santa Rosa, CA (US)

(73) Assignee: PNI Corporation, Santa Rosa, CA (US)

( * ) Notice: Subject to any disclaimer, the term of this patent is extended or adjusted under 35 U.S.C. 154(b) by 127 days.

(21) Appl. No.: 11/502,593

(22) Filed: Aug. 9, 2006
(Under 37 CFR 1.47)

(51) Int. Cl.
*G01C 17/38* (2006.01)

(52) U.S. Cl. .................. 33/356; 701/224; 702/92

(58) Field of Classification Search .............. 33/355 R, 33/356, 357; 702/85, 92, 93, 94, 17, 70, 702/190; 701/224
See application file for complete search history.

(56) References Cited

U.S. PATENT DOCUMENTS

| | | | | |
|---|---|---|---|---|
| 4,343,035 A | * | 8/1982 | Tanner | 701/220 |
| 4,539,760 A | | 9/1985 | Marchent et al. | |
| 4,656,750 A | * | 4/1987 | Pitt et al. | 33/352 |
| 4,686,772 A | | 8/1987 | Sobel | |
| 4,851,775 A | | 7/1989 | Kim et al. | |
| 5,235,514 A | * | 8/1993 | Matsuzaki | 701/221 |
| 5,239,264 A | | 8/1993 | Hawks | |
| 5,381,603 A | | 1/1995 | Lee | |
| 5,654,906 A | * | 8/1997 | Youngquist | 702/94 |
| 5,953,683 A | * | 9/1999 | Hansen et al. | 702/95 |
| 6,009,629 A | | 1/2000 | Gnepf et al. | |
| 6,243,660 B1 | | 6/2001 | Hsu et al. | |
| 6,421,622 B1 | * | 7/2002 | Horton et al. | 702/95 |
| 6,539,639 B2 | * | 4/2003 | Smith | 33/356 |
| 6,543,146 B2 | * | 4/2003 | Smith et al. | 33/356 |
| 6,549,145 B2 | | 4/2003 | Hsu et al. | |
| 6,587,070 B2 | * | 7/2003 | Hallse | 342/62 |
| 6,651,003 B2 | * | 11/2003 | Woloszyk et al. | 701/224 |
| 6,860,023 B2 | | 3/2005 | Manfred et al. | |
| 7,249,419 B2 | * | 7/2007 | Sato | 33/356 |
| 2005/0242805 A1 | | 11/2005 | Honkura et al. | |
| 2005/0283988 A1 | | 12/2005 | Sato et al. | |
| 2008/0071492 A1 | * | 3/2008 | Skvortsov et al. | 702/92 |

\* cited by examiner

*Primary Examiner*—G. Bradley Bennett
*Assistant Examiner*—Amy Cohen Johnson
(74) *Attorney, Agent, or Firm*—Fernandez & Associates, LLP

(57) ABSTRACT

A magnetic compass apparatus and method to account for magnetic distortion while determining a magnetic heading is disclosed. The method enables a compass module, comprising at least two magnetometers, to characterize its magnetic environment dynamically, while collecting data of a geomagnetic field; a user moves an apparatus through various orientations; the environment may or may not contain magnetic distortion influences. Data gathered by magnetometers and, optionally, accelerometers are processed through at least two filters before being transferred as a processed data set for repetitive measurement calculations. A series of calculations is executed recursively in time by solving one or more linear vector equations using processed data.

16 Claims, 11 Drawing Sheets

Measurement space without distortions

Measurement space with distortions

Initializations

Stability_threshold = 30nT     (for stability filter)
Minimum_tilt_threshold = 10°   (for minimum-tilt-separation filter)

$$last\_accepted\_tilt = \begin{pmatrix} initial\_p \\ initial\_r \end{pmatrix}$$  (deduced from the first accelerometer data)

$$filter\_buffer = \begin{pmatrix} 0 & 0 & 0 & 0 & 0 & 0 & 0 \\ 0 & 0 & 0 & 0 & 0 & 0 & 0 \\ 10^5 & 0 & 0 & 0 & 0 & 0 & 0 \\ 10^5 & 0 & 0 & 0 & 0 & 0 & 0 \\ 10^5 & 0 & 0 & 0 & 0 & 0 & 0 \end{pmatrix}$$   (for median filter)

Initial state parameter vectors:

$$w1 = \begin{pmatrix} 0 \\ 0 \\ 1 \\ 0 \\ 1 \\ 0 \\ 0 \\ 0 \\ 10^4 \end{pmatrix} \quad w2 = \begin{pmatrix} 0 \\ 0 \\ 0 \\ 1 \\ 0 \\ 0 \\ 0 \\ 1 \\ 50 \end{pmatrix}$$

and initial error covariance matrix:

$P1 = P2 = 10^5 \cdot I_9$   (for first and second stage recursive least squares estimator)

Initial C Matrix and L vector, constructed by the elements of the state vector $w1$:

$$C = \begin{pmatrix} 1 & w1(1) & w1(2) \\ w1(1) & w1(3) & w1(4) \\ w1(2) & w1(4) & w1(5) \end{pmatrix} \quad L = \begin{pmatrix} w1(6) \\ w1(7) \\ w1(8) \end{pmatrix}$$

(for estimation of an upper-triangular soft-iron distortion matrix $S_{ut}$ and hard-iron offset $H$ vector using the first stage recursive least squares estimator)

Initial $H$ and $S_{ut}$,
$H_i = C^{-1} \cdot L = 0$, $S_{ut} = \text{Chol}(C) = I_3$   (Chol is operation of Cholesky decomposition)
Initial rotation matrix:
$R = I_3$,
and initial rotation refined soft-iron matrix:
$S_i = R \cdot S_{ut} = I_3$    (for second stage recursive least squares estimator)
Recursive least squares parameter $\lambda = 0.9$

FIG. 4A

Main Program of Magnetic Distortion Correction Algorithm Block Diagram

Step 301.
Receive new data:

magnetometer data $Bm = \begin{pmatrix} Bm_x \\ Bm_y \\ Bm_z \end{pmatrix}$ and accelerometer data $A = \begin{pmatrix} A_x \\ A_y \\ A_z \end{pmatrix}$.

Calculate best guess of magnetic field correction of soft-iron distortion and hard-iron offset: $Bc = S_i \cdot (Bm - H_i)$

Step 305.
Stability filter: compare the present magnetometer data $Bm1$ with two previous readings $Bm2$, and $Bm3$: $\Delta Bm12 = |Bm1 - Bm2|$, $\Delta Bm13 = |Bm1 - Bm3|$, $\Delta Bm23 = |Bm2 - Bm3|$. If any $\Delta Bm >$ stability_threshold, then break and go back to step 301.

Step 306.
Minimum tilt separation filter: compare a new pitch-roll (tilt), deduced from the present accelerometer data, with the last accepted pitch-roll, $$\begin{pmatrix} \Delta p \\ \Delta r \end{pmatrix} = \left| \begin{pmatrix} p \\ r \end{pmatrix} - last\_accepted\_tilt \right|$$

If $\Delta p <$ minimum_tilt_threshold and $\Delta r <$ minimum_tilt_threshold, then break and go back to step 301.

FIG. 4B

Step 310.
Median filter: submit data that satisfy step 305 and 306 to a median filter based on the value of projection of the acceleration vector $A$ to the corrected magnetometer vector (with present best guess of soft-iron matrix and hard-iron vector), $proj = A^T \cdot Bc$.
Shift in a new row of data into the filter buffer, eliminating the last row of the old filter buffer, $$filter\_buffer = \begin{pmatrix} proj & A_x & A_y & A_z & Bm_x & Bm_y & Bm_z \\ 0 & 0 & 0 & 0 & 0 & 0 & 0 \\ 0 & 0 & 0 & 0 & 0 & 0 & 0 \\ 10^5 & 0 & 0 & 0 & 0 & 0 & 0 \\ 10^5 & 0 & 0 & 0 & 0 & 0 & 0 \end{pmatrix}$$

Create a sorted version of the first-in-first-out buffer based on the first column, $$sorted\_filter\_buffer = \begin{pmatrix} 0 & 0 & 0 & 0 & 0 & 0 & 0 \\ 0 & 0 & 0 & 0 & 0 & 0 & 0 \\ proj & A_x & A_y & A_z & Bm_x & Bm_y & Bm_z \\ 10^5 & 0 & 0 & 0 & 0 & 0 & 0 \\ 10^5 & 0 & 0 & 0 & 0 & 0 & 0 \end{pmatrix}$$

The output of the median filter is based on the accelerometer and magnetometer data at the middle row of the sorted filter buffer:

$$median\_filter\_magnetometer\_ouput = Bm = \begin{pmatrix} Bm_x \\ Bm_y \\ Bm_z \end{pmatrix}$$

$$median\_filter\_accelerometer\_output = A = \begin{pmatrix} A_x \\ A_y \\ A_z \end{pmatrix}$$

FIG. 4C

Recursive Least Squares soft-iron distortion and hard-iron offset estimator 320.
Recursive least squares engine equations (to get next estimate of state vector $w$, and update on error covariance matrix $P$):

$(w(n), P(n))$ = recursive_least_squares_engine($u$, $obs$, $w(n-1)$, $P(n-1)$, $\lambda$)

$$k = \frac{P(n) \cdot u(n)}{\lambda + u(n)^T \cdot P \cdot u(n)}$$ calculate the Kalman gain $\alpha = obs(n) - w(n)^T \cdot u(n)$ calculate the a priori error estimate $w(n) = w(n-1) + k \cdot \alpha$ get the next state vector estimate $$P(n+1) = \frac{1}{\lambda} \cdot \left(I_9 - k \cdot u(n)^T\right) \cdot P(n)$$ update the error covariance matrix where $n$ represents a current time point.

Step 325.
First-stage estimator:
Construct the observation and input vector as per equation 11 in the specification of this application, using the output of the median filter for the magnetometer data, $obs1 = Bm_x^2$ $$u1 = \begin{pmatrix} -2Bm_x Bm_y \\ -2Bm_x Bm_z \\ -Bm_y^2 \\ -2Bm_y Bm_z \\ -Bm_z^2 \\ 2Bm_x \\ 2Bm_y \\ 2Bm_z \\ 1 \end{pmatrix}$$

Submit to recursive least squares engine equation of 320 to get new first-stage state vector $w1$ and error covariance matrix $P1$,
$(w1(n), P1(n))$ = recursive_least_squares_engine($u1$, $obs1$, $w1(n-1)$, $P1(n-1)$, $\lambda$).
Derive C matrix and L vector using the estimated state vector elements, $$C = \begin{pmatrix} 1 & w1(1) & w1(2) \\ w1(1) & w1(3) & w1(4) \\ w1(2) & w1(4) & w1(5) \end{pmatrix} \quad L = \begin{pmatrix} w1(6) \\ w1(7) \\ w1(8) \end{pmatrix}$$

Test C matrix for positive definiteness for conduct Cholesky decomposition using a Matlab code:
$(S_{ut\_maybe}, pos\_def)$ = Cholesky_decomposition(C).
If pos_def = FALSE, then break and go back to step 301, If pos_def = TRUE, then deduce the upper-triangular soft-iron distortion matrix and hard-iron offset vector,
$S_{ut} = S_{ut\_maybe}$, $H = C^{-1} \cdot L$,
Calculate the first-stage correction of geomagnetic field $Bc = S_{ut} \cdot (Bm - H)$.

FIG. 4D

Step 326.
Second-stage estimator:
Construct the observation and input vector as per equation 15 in the specification of this application, using most recently corrected geomagnetic field $Bc$ and the output of median filter for the accelerometer data, $$Obs2 = A_x \cdot Bc_x$$

$$u2 = \begin{pmatrix} -A_x Bc_y \\ -A_x Bc_z \\ -A_y Bc_x \\ -A_y Bc_y \\ -A_y Bc_z \\ -A_z Bc_x \\ -A_z Bc_y \\ -A_z Bc_z \\ 1 \end{pmatrix}$$

Submit to recursive least squares engine equation of 320 to get new second-stage state vector $w2$ and error covariance matrix $P2$, $(w2(n), P2(n))$ = recursive_least_squares_engine($u2$, $obs2$, $w2(n-1)$, $P2(n-1)$, $\lambda$).

Based on the just extracted state vector parameters, construct a scaled version of the rotation matrix $T$, $$T = \begin{pmatrix} 1 & w2(1) & w2(2) \\ w2(3) & w2(4) & w2(5) \\ w2(6) & w2(7) & w2(8) \end{pmatrix} = \begin{pmatrix} 1 & R_{12}/R_{11} & R_{13}/R_{11} \\ R_{21}/R_{11} & R_{22}/R_{11} & R_{23}/R_{11} \\ R_{31}/R_{11} & R_{32}/R_{11} & R_{33}/R_{11} \end{pmatrix}$$

Check if the determinant of matrix T is negative, break and go back to step 301.
Otherwise, calculate normalization coefficient $R_{11}$, $$R_{11} = \left(\frac{1}{|T|}\right)^{\frac{1}{3}}$$

Unnormalize the scaled version of rotation matrix T to deduce rotation matrix R,
$$R = R_{11} \cdot T.$$
Update the estimate of soft-iron distortion matrix S,
$$S = R \cdot S_{ut}$$
Generate second-stage estimator output which is an estimate of undistorted Earth magnetic field as per equation 1 in the specification of this application,
$$Be = S \cdot (Bm - H)$$

End of loop of magnetic distortion correction algorithm.

FIG. 4E

2-Axis Measurement Space

Measurement space without distortion

Measurement space with hard iron distortion

Measurement space with soft iron distortion

AUTOMATIC CALIBRATION OF A THREE-AXIS MAGNETIC COMPASS

BACKGROUND INFORMATION

1. Field of Invention

The invention relates generally to the determination of compass heading through the sensing of Earth's magnetic field, and more particularly to a method and an apparatus for use in magnetic compasses for the characterization of compass magnetic environment and compensation of the heading indications to account for local magnetic distortions.

2. Cross-Reference to Related Documents

The present invention is related in part to U.S. Pat. No. 4,851,775 entitled Digital Compass and Magnetometer Having A Sensor Coil Wound on a High Permeability Isotropic Core issued to Kim, et al. on Jul. 25, 1989, to U.S. Pat. No. 5,239,264 entitled Zero-Offset Magnetometer Having Coil and Core Sensor Controlling Period of an Oscillator Circuit issued to Timothy J. Hawks on Aug. 24, 1993, to U.S. Pat. No. 5,381,603 entitled Reference Pointer For a Compass Display issued on Jan. 17, 1995 to John S. Lee, to U.S. Pat. No. 6,243,660 entitled Digital Compass with Multiple Sensing and Reporting Capability to George Hsu, et al. on Jun. 5, 2001, and to U.S. Pat. No. 6,549,145 entitled Radar/Laser Detection Device with Multi-sensing and Reporting Capability, to George Hsu, et al. Disclosure from these patents is included herein in their entirety by reference.

BACKGROUND OF INVENTION

Electronic magnetic compasses have used magnetic sensor based magnetometers to measure magnetic fields and to determine orientation with respect to the Earth's magnetic field. For the magnetometers to be perfectly calibrated for magnetic compassing, they must sense Earth's magnetic field, and nothing else. However, local disturbances in an ambient magnetic field usually exist due to nearby magnetic objects, for example, ferrous or high permeability materials, and magnetic fields generated by electrical currents. Compass magnetometer readings must be corrected to account for these magnetic measurement impairments in order for an accurate direction heading to be obtained. When a compass is tilted, a large Z component of the field gets mapped to X-Y (horizontal) plane, translating into a heading error; for instance, depending on latitude and orientation, tilting a compass even one degree can lead to 2 to 5 degrees of heading error. Therefore, combined information from distortion compensated magnetic field measurements and estimations of pitch and roll via gravitational acceleration sensor components are required to determine an accurate estimate of the heading, irrespective of whether the system remains level or not. A three-axis tilt-compensated magnetic compass provides an ideal solution. An early example of a digital compass employing at least one novel magnetometer and comprising a microprocessor among other components is given in U.S. Pat. No. 4,851,775; a much improved version of this device is disclosed in U.S. Pat. No. 6,243,660 and again in U.S. Pat. No. 6,549,145, all owned by the present assignee. U.S. Pat. No. 6,243,660 and U.S. Pat. No. 6,549,145 teach the use of an inclinometer or accelerometer for refining compass headings.

Some known conventional compensation techniques have been implemented; many are limited to two-axis compasses and do not yield results appropriate for a plurality of arbitrary orientations of the compass in three-dimensional space. One such legacy approach requires an user to drive in a circle to collect a large quantity of data. A microprocessor then picks out the maximum and minimum readings from the data in both the X and Y direction, and calculates a gain and offset. This approach is rather sensitive to noise and sampling rate, and may easily result in a poor choice in selected maximum or minimum values for centering the offset and calculating the gain, resulting in poor compensation of the distortion. An alternative approach is to use all collected data and implement a least squares method to solve matrix equations; this method is certainly much less sensitive to noise and more reliable; however it requires a large amount of memory and processing time that a cost-effective microprocessor may not be able to perform in an acceptable time period. The dynamic and time-varying nature of magnetic field distortions requires that any effective magnetic distortion compensation technique, especially one applied to compassing, diminishes its use of older sensor data, allowing the compass to adapt quickly and efficiently to maintain its heading accuracy within such a changing magnetic environment. Moreover, effectively filtering the sensor data to remove spurious data is crucial in preventing noise from affecting the estimates of the distortion for the purposes of such compassing applications.

Some conventional compensation techniques have been applied to three-axis compasses. Such conventional techniques failed to address the magnetic environment's dynamic, spurious or noisy nature. Most legacy compasses require performing calibration measurements by setting the compass unit at a variety of geometrically different orientations and azimuths, and collecting a sizable set of data before conducting calibration calculations. One compensation technique as described in U.S. Pat. No. 4,686,772 requires knowledge of the earth's magnetic field at the site of measurement, requiring additional cartographic sources to yield values of magnetic inclination of Earth's magnetic field for the respective site. In U.S. Pat. No. 4,539,760 it is assumed that the calibration correction matrix is symmetric, which is true only in isolated cases.

U.S. Pat. No. 6,009,629 describes a process for determining the direction of the Earth's magnetic field. An electronic magnetic compass containing three magnetic field sensors and two inclination sensors is first arranged in a number of different spatial positions to collect the sensor signals and inclination values, magnetic field values being determined from these signals. The inclination sensors measure the pitch and roll angles; note, the magnetic field inclination (the dip angle) is not measured. The measurement of Earth's gravity vector may come from an inclinometer or accelerometer, either MEMS based or otherwise. The outputs of both types of sensors are processed to yield calibrated estimates of the Earth's gravity vector. Historically, an inclination sensor is made from a glass tube with a liquid, designed to measure deviation from a vertical. In the instant invention, inclination is measured using a triaxial MEMS accelerometer capable of measuring the earth's gravitational force directly. In general, an accelerometer apparatus comprises one, two or three axis measurement capability in a single device or module. A linear vector equation is solved using a least squares method to obtain earth's magnetic field vector; this invention requires the number of measurements to be at least equal to the number of parameters to be determined in the vector equation. Twelve measurements are the stated minimum. Mathematically it is possible to determine the direction of the actual magnetic field vector with this technique; practically, the accuracy of the result relies heavily on the quality of the data, including the signal-to-noise ratio, collected at various positions. Thus the results may be easily influenced by spurious or noisy data. More measurements may statistically reduce the effect of noisy data. U.S. Pat. No. 6,860,023 employs a similar technique as U.S. Pat. No. 6,009,629; however undistorted magnetometer readings or other positional data are required. Yamaha and Aichi Steel Corporation have disclosed multi-axis integrated sensors; U.S. 20050283988 discloses a method for magnetic heading using a 2-axis magnetic sensor in a cell phone; U.S. 20050242805 discloses a three-dimensional magnetic direction sensor; neither take into account external perturbation of the earth's magnetic field. There is a need for a high precision magnetic measurement instrument which can function in a magnetically distorted environment with accuracy sufficient for determining an azimuth within 1° of true magnetic north.

SUMMARY OF INVENTION

In the instant invention a user calibration algorithm allows a "Tilt-compensated Compass Module", or TCM apparatus, to characterize a magnetic environment while a user moves a unit through various orientations, continuously or stepwise; optionally orientations may be randomly selected. A user calibration algorithm may also be referred to as a magnetic distortion correction algorithm. In one embodiment the method first characterizes and corrects for the gain imbalances, cross axis sensitivities and offsets of each of the magnetometer sensors. In one embodiment, a magnetic distortion correction algorithm may also characterize and correct for residual rotation between magnetometer and accelerometer coordinate systems. A method enables a compass module to characterize its magnetic environment dynamically, either upon startup or continuously or at a user's optional command. The apparatus comprises at least two magnetometers, optionally, a magnetometer with two axes, optionally, one or more accelerometers to gather data of at least one component of the gravitational acceleration vector, or gravity field strength, while the user, at his discretion, moves a module through various orientations; magnetic declination angle, magnetic field strength information or heading computed by GPS may be entered into an apparatus of the instant invention wirelessly or by other means for entering data. The environment may or may not contain magnetic distortion influences. In one embodiment data gathered by magnetometers and accelerometers are processed through at least two filters before being transferred as input data to an adaptive calibration methodology. A series of calculations are executed recursively in time by solving one or more linear vector equations using processed input data. In this way, the instant invention's methodology places no requirements on collecting a minimum number of measurements, and/or setting the compass unit at a predetermined combination of specific orientations prior to executing a calibration or magnetic heading output. The invented method and apparatus calculates a determination of an undistorted earth's magnetic field and an accurate tilt-compensated magnetic heading in the presence of objects distorting the earth's magnetic field. At the user's discretion a determination of magnetic field distortions is updated continuously; optionally, a user may disable a calibration mode and/or an updating mode for magnetic field distortions. In general at least five readings at, at least somewhat different headings and attitudes, are necessary for a magnetic heading reading to begin to show improved accuracy in the presence of magnetic distortion and/or attitude correction.

While GPS is excellent at determining location, it is unable to determine orientation when a user is stationary. GPS is also susceptible to signal interruption, as the line of sight communication link to any given satellite may be broken by a building or even tree foliage. In particular, GPS signals are not received through water; because of GPS communication reliability limitations. Hence a digital compass is important for both navigation and orientation measurements. During field use, the magnetic distortion field created by the system can change. For example a magnet inside a speaker will change its magnetic field at different temperatures which will in turn change the distortion field created by the system. This type of effects can also be seen on guns, where after a round of fire, the magnetic signature on the gun has changed. There are also situations where a handheld device with a compass is placed inside a vehicle. Once inside the vehicle, the magnetic distortion field is not only due to the device but also due to the metal in the vehicle. When there are magnetic distortion changes, either a user has to perform a distortion calibration by rotating the device or driving the vehicle in a circle. It is difficult for a user to know when to calibrate for the distortion and it is inconvenient for the user to perform a calibration each time the magnetic distortion field is changed. Hence there is a need for continuous user calibration as outlined in this invention; when the magnetic distortion field is changed, the algorithm will collect data in the background and correct for the distortion automatically.

The user calibration in the instant invention can be for either 2 axis or 3 axis compasses. It is easier to determine the distortion for a 2 axis system which requires less computing power and memory. Hence, for certain applications where the system or device would be used in a level situation, it would be more cost effective to use a 2 axis system. For instance, in a vehicle, a 2 axis compass with 2 axis user calibration would be less expensive and still meet the accuracy requirements.

User calibration may not be limited to just one set of distortion correction coefficients for a device or system. A device or system may have capability to store multiple distortion correction coefficients to provide accurate compass readings in different device user modes. For instance, magnetic sensors read a different magnetic distortion field from a flip phone when the top is closed versus when it is open. Even with continuous distortion calibration, it may be difficult to have instantaneous, accurate compass readings each time the phone's top is opened and closed. A preferred implementation is to have 2 sets of distortion coefficients where the compass heading calculation would use one set of distortion correction coefficients when a cell phone top is closed and another when the top is open. A similar implementation would work if a device is being put in and out of vehicles; distortion correction coefficients for outside the car and distortion correction coefficients for inside the car. Having multiple distortion coefficients enables the compass to calculate a more accurate heading more quickly, if not instantaneously, in different situations.

In one embodiment, a compass apparatus processes data received from at least two and preferably three magnetometers, and at least one and preferably two accelerometers or alternative gravity field strength sensors, to generate continuously updated input data for magnetic heading calculation. As used herein a means for gravity field strength sensing comprises means for tilt sensing comprising inclinometer, accelerometer and/or gyroscope; a magnetometer may comprise one, two or three axis measurement capability; as used herein when an apparatus comprises two or more magnetometers each magnetometer has a single axis measurement capability. In one embodiment, a compass apparatus executes a two-stage recursive least squares algorithm to calculate a soft-iron distortion matrix S, a hard-iron offset vector H and a rotation matrix R, recursively in time, using filtered input data. Optionally, a user can disable a portion of a continuously updating algorithm, comprising, for instance, the soft-iron distortion matrix S, a hard-iron offset vector H and a rotation matrix R, in order to save power or other considerations; the magnetic heading reading and pitch and roll reading are updated continuously regardless however all possible magnetic distortion corrections are not included in the readings. The instant invention compass apparatus generates output data comprising an undistorted Earth's magnetic field measurement, a pitch measurement, a roll measurement, and a tilt-compensated compass heading. Low cost embodiments of the instant invention are possible by minimizing the number of filters and complexity of the compensation algorithms; accuracy is compromised in exchange for a lower unit cost.

In another embodiment, a two or three-axis magnetic compass module characterizes and compensates a magnetic distortion to determine a compass heading, as well as pitch, and roll for a three-axis tilt compensated compass. A compass module comprises a processor, coupled to a user interface, two or more magnetic and zero or one or more gravity field strength sensors, such as acceleration-sensors, and a means for information storage such as, optionally, volatile semiconductor, non-volatile semiconductor or hard disk portions wherein at least one from a group comprising gravity field strength reading, magnetometer reading, one or more sets of calibration settings, one or more sets of calculated pitch, roll, and tilt-compensated heading readings, initialization values, filtering algorithm, location code and identity code are stored therein.

The instant invention compass module processes gathered data from sensors, stores at least some processed data in memory, executes a two-stage algorithm comprising a recursive least squares method with a predetermined set of initialization values, calculates a compensation of the measured magnetic field to generate an output of undistorted earth's magnetic field, and calculates heading for a 2 axis compass and tilt-compensated heading for a 3 axis compass, and generates an output, optionally, utilizing a means for communicating via a user interface such as a visual display, visual touch display, keyboard, signals via hard wire, Bluetooth, video, voice, RF, optical fiber, telephonic, wireless or other means known to one knowledgeable in the field. In an embodiment wherein a magnetic compass module is a subsystem of another system an "interface device" may comprise communicating an algorithm embedded in software code; a corrected heading may be communicated from one software sub-routine to another via digital symbols for decision making or navigation purposes; results may not pass through a classical interface device in such an embodiment.

A means for communicating may also comprise a means, such as a switch, for a user to initiate or stop a calibration algorithm resident in a memory or processor. A processor may comprise two processors, for example, one for signal conditioning and one for processing other requirements; alternatively a means for processing may comprise a single chip processor with one or more processor cores or other circuit solutions known to one knowledgeable in the art.

Symbols

The following symbols are used:
A Gravitational acceleration vector as measured by a triaxial accelerometer
Bc First-stage corrected geomagnetic field vector
Be Undistorted Earth's magnetic field vector
Bm Magnetic field vector as measured by a triaxial magnetometer
S Magnetic soft-iron distortion matrix
$S_{ut}$ Magnetic soft-iron distortion matrix in upper triangular form
C A 3×3 symmetrical matrix that is equal to $S^T \cdot S$
H Magnetic hard-iron offset vector
R A rotation matrix for refined second-stage compensation
T A scaled rotation matrix of matrix R, using the first element $R_{11}$ as the scaling factor.
L A 3×1 vector that equals C-H
obs(n) An scalar observation quantity at a discrete time index n
u(n) A 9×1 input vector at time n, linearly related to obs(n)
w A 9×1 state parameter vector to be estimated using the recursive least squares (RLS) process. Contains information about the hard and soft iron distortion parameters.
P A 9×9 error covariance matrix used for solving a linear vector equation with a recursive least squares method
k Kalman gain, used for weighing the new information against the previous estimate
λ A parameter to adjust the forgetting factor of the recursive least squares estimator
$I_9$ A 9×9 identity matrix
$\vec{g}$ down vector in the earth coordinate system, pointed to the center of the earth
$\vec{n}$ north direction vector of earth's coordinate system, pointed in the direction of the magnetic North Pole in the local horizontal plane
$\vec{e}$ east direction vector of earth's coordinate system, pointed in an easterly direction in the local horizontal plane
i Inclination or dip angle
p pitch angle
r roll angle
y yaw angle or heading angle
proj projection of acceleration vector to magnetic field vector, as sensed by the compass module, defined as $A^T * Be$.
$\vec{X}$ Compass orientation vector of compass coordinate system, or the direction the compass is pointed

BRIEF DESCRIPTION OF DRAWINGS

FIG. 4A shows a parameter initialization required for the algorithm of FIG. 3.

FIG. 4B shows detail processes of step 301, receive new data, step 305, a stability filter, and step 306, a minimum-tilt-separation filter.

FIG. 4C shows details of step 310, a median filter with a first-in-first-out buffer.

FIG. 4D describes step 325, part of the recursive least squares soft-iron distortion and hard-iron offset estimator 320, to deduce an upper triangular soft-iron matrix and a hard-iron offset vector.

FIG. 4E describes step 326, second stage estimator, part of a recursive least squares soft-iron distortion and hard-iron offset estimator 320, to deduce a rotation matrix for determining earth's magnetic field, as the end of a whole loop 260.

DETAILED DESCRIPTION OF EMBODIMENT(S)

For magnetometers to be well calibrated for magnetic compassing, they must only sense Earth's magnetic field, and nothing else. With three magnetometers on three axes in an ideal situation, the measurements will seem to ride along the surface of a sphere of constant radius, herein referred to as a "measurement space." The end-user may install a well calibrated module from a factory into an application whose magnetic environment contains distortions of a measurement space, and subsequently obtain a measurement with significant error in heading accuracy.

Figure 1A:
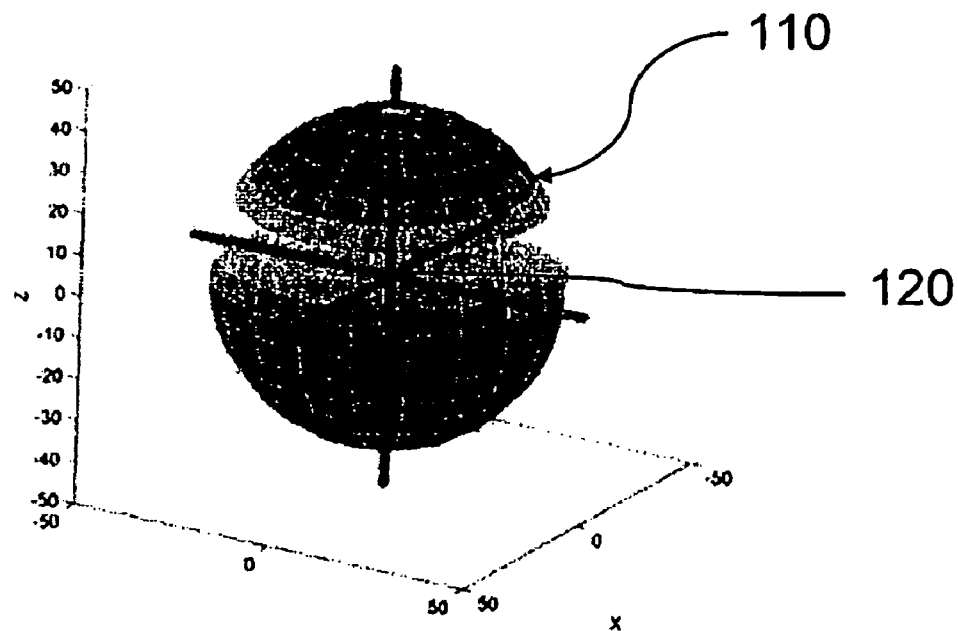
FIG. 1A is a graphical depiction of the possible three axis magnetometer measurements, herein called "measurement space", for a perfectly calibrated magnetometer without hard-iron and soft-iron distortions.
Figure 1B:
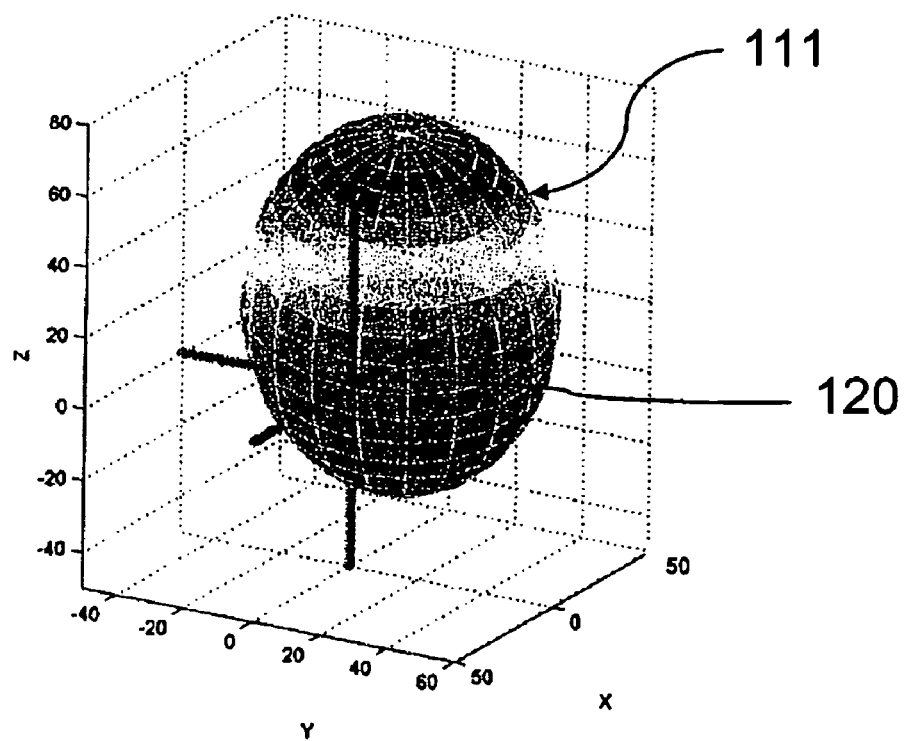
FIG. 1B is schematically a measurement space with hard-iron and soft-iron distortions.

Two most common impairments to the measurement space are hard-iron and soft-iron distortions. The hard-iron distortion may be described as a fixed offset bias to the magnetometer readings, effectively shifting the origin of the ideal measurement space. It is usually caused by a permanent magnet mounted on or around the fixture of the compass installation and can be expressed as an offset vector H. Soft-iron distortion is a direction dependent distortion of the gains of the magnetometers, often caused by the presence of high permeability materials in or around the compass fixture and can be expressed as a distortion matrix S, mathematically. FIG. 1A shows an undistorted measurement space 110, or the locus of measurements for a perfectly calibrated three-axis magnetic compass about coordinate axes 120. FIG. 1B shows magnetometer readings with a hard-iron offset impairment of 10 μT in the X direction, 20 μT in the Y direction, and 30 μT in the Z direction, and soft-iron distortion impairments. The locus of measurements 111 has now changed from being spherical to ellipsoidal about coordinate axes 120.

To express a magnetic distortion mathematically, the undistorted Earth's magnetic field is represented as vector Be and what is measured by the magnetometers as vector Bm. The two quantities can be directly related by the following equation:

$$Bm = S^{-1} \cdot Be + H \quad Be = S \cdot (Bm - H) \qquad (1)$$

where S is a soft-iron distortion matrix, [3×3] and H is the hard-iron offset vector, [3×1]. An automatic calibration method of this invention is aimed to undo the effects of S and H to achieve a compensation of the distorted geomagnetic field so that an accurate heading estimate can be obtained.

In one embodiment of the invention, a three-axis magnetic compass comprises three magnetometers and three accelerometers to characterize a magnetic environment while a user rotates a compass module through various orientations. At predetermined time intervals, three magnetometer readings of a distorted geomagnetic field and three accelerometer readings of a gravitational acceleration vector are sensed, providing an approximate snapshot state of a module's orientation. In all embodiments, two mathematical postulates are imposed to enable the instant invention's automatic calibration and measurement algorithm:

1) The magnitude of earth's magnetic field is constant, regardless of a compass module's orientation at any given position on earth.

2) At any given position on earth, the angle formed between earth's magnetic field vector and earth's gravitational acceleration vector is constant, regardless of a compass module's orientation.

The first postulate is used to mathematically bend and stretch the magnetometer axes such that they are orthogonal to each other and gain matched, providing an approximate estimate of the soft-iron distortion matrix, S. At this stage, the hard-iron offset vector H is also determined. The second postulate is used to determine a rotation matrix, R, that fine tunes the earlier estimate of the soft-iron distortion and aligns the magnetometer coordinate system with the accelerometer coordinate system. The algorithm processes in two stages. A first-stage algorithm re-centers the ellipsoidal measurement space about the origin and makes it spherical. A second-stage algorithm rotates the sphere slightly. This represents a process to transform an ellipsoidal locus 111 in FIG. 1B back to a spherical one 110 in FIG. 1A, plus re-align coordinate axes 120.

Figure 2:
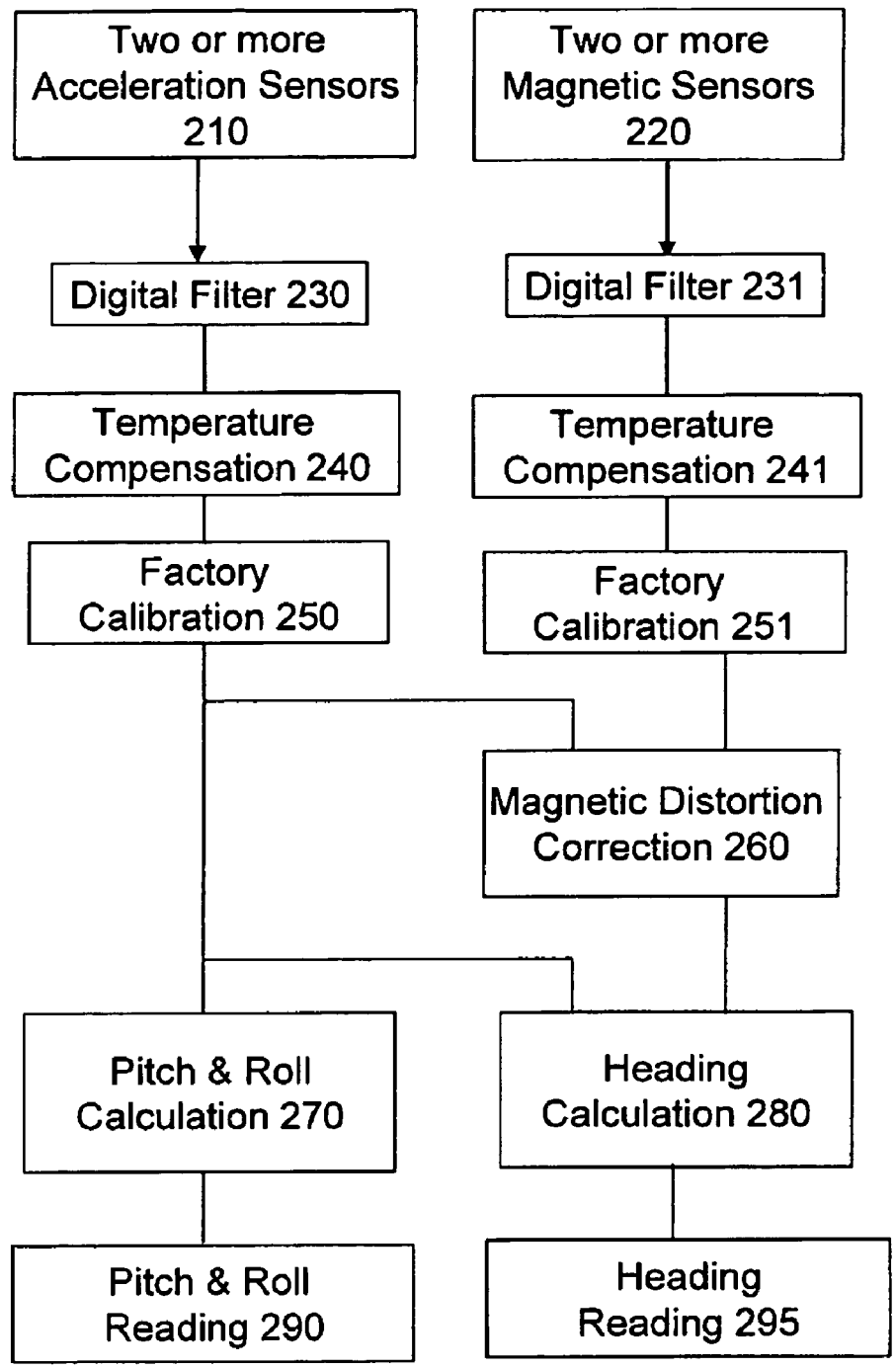
FIG. 2 is a functional block diagram of a magnetic compass module.

FIG. 2 illustrates the function block diagram of one embodiment of the magnetic compass apparatus according to this invention. One or, preferably, two or, most preferably, three acceleration sensors 210 and two or three magnetic sensors 220 are used to continuously collect raw data for an apparatus. As raw sensor data is collected, it is communicated to Finite-Impulse-Response (FIR) digital filter 230 or 231 respectively for data from sensors 210 and 220, which processes the data to reduce the noise in the sensor readings. In an embodiment a first digital filter is a Finite-Impulse-Response (FIR) filter; in an embodiment a second digital filter is a Finite-Impulse-Response (FIR) filter. Next, a temperature compensation scheme 240 or 241 processes the data to reduce gain and offset drift with respect to temperature; in an embodiment a temperature compensator processes a difference of sensor data at forward bias and reverse bias condition. Alternatively, for example, in an embodiment, a magneto-inductive sensor is forward biased and then reversed biased, and the difference between the readings taken under these conditions is understood to be temperature compensated. Next in the block diagram, sensor data are submitted to calibration correction stage 250 or 251, in which, for example, magneto-inductive sensor data is processed with a least squares fitting function which estimates and corrects for any nonlinearity between magnetic sensor readings and applied magnetic fields as well as cross axis sensitivities using coefficients determined in a factory calibration procedure and stored in memory in an electronic magnetic compass apparatus. Output data of 250 or 251 contains values of the acceleration vector or magnetic field vector for a given point in time, which is an accelerometer reading and a magnetometer reading as measured by an instant invention apparatus in the field based on coefficients determined in a factory calibration procedure. A compass apparatus directly uses said accelerometer reading to conduct a pitch and roll calculation 270 and yield pitch-roll reading 290. The magnetometer reading however needs to correct a local soft-iron and hard-iron magnetic distortion through a magnetic distortion correction 260 algorithm based on postulates 1) and 2). In one embodiment of an algorithm, both accelerometer readings and magnetometer readings are used to determine an undistorted earth's magnetic field vector. Based on measured accelerometer data and corrected magnetometer data, a heading calculation 280 with tilt compensation is done, yielding a compass heading 295.

A triaxial accelerometer used in one embodiment of a compass of the instant invention allows for an unrestricted range of orientations, including a complete inversion of the compass module. Note that measurements under an inverted orientation are not possible with a 2 axis inclination sensor in many applications. Similarly, a triaxial magnetometer used in the invention advantageously overcomes latitude-dependent, tilt-induced compass heading error evident in a magnetic compass using solely a two-axis magnetic sensor with no inclination input. A three-axis magnetic compass apparatus according to the invention presently has a specified heading accuracy of 0.3 degrees and a tilt accuracy of 0.2 degrees over a temperature range of −40 to +85° C. An alternative embodiment comprises one, two or three gyroscopes for sensing in addition to or in place of accelerometers; optionally, gyroscopes or accelerometers are MEMS devices of at least one dimensionality. Other means for gravity field strength sensing are acceptable as long as capabilities to sense and communicate, an axial component of earth's gravitational field strength is embodied therein; "one means" refers to means for sensing one axis or component of earth's gravitational field strength.

Figure 3:
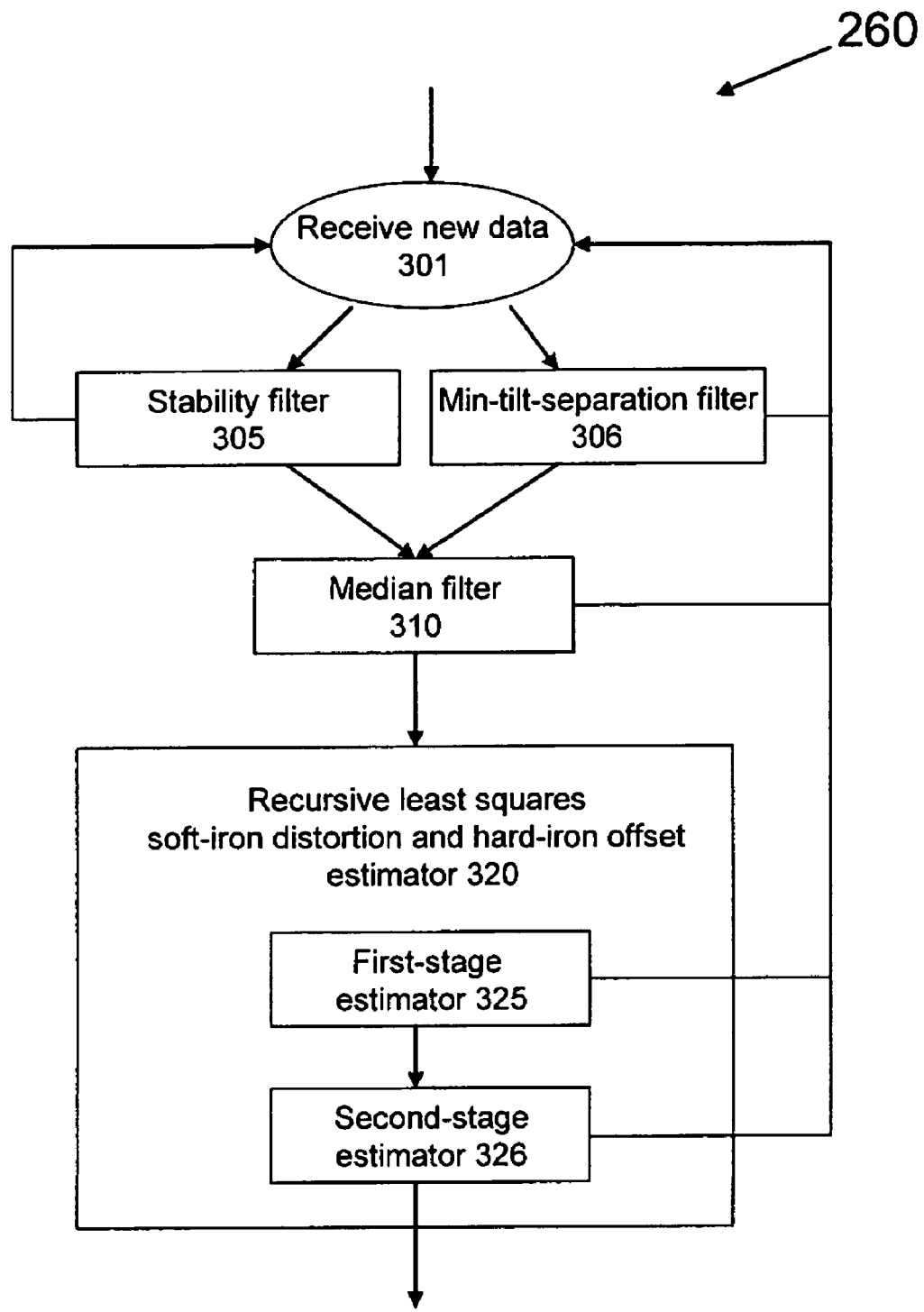
FIG. 3 is a flow chart diagram for a magnetic distortion correction algorithm 260.

FIG. 3 is a flow diagram of one embodiment of a two-stage magnetic distortion correction algorithm 260. New data 301, is processed through four processing stages in this algorithm:

stability filter 305 for magnetic data, minimum-tilt-separation filter 306 for accelerometer data, median filter 310, in which magnetic and accelerometer data are combined using a first-in-first-out buffer, and an exponentially weighted, recursive least squares estimator 320, also known as a fading memory Kalman filter.

As new magnetometer and accelerometer data sets are received at step 301, a stability filter 305 is used to check whether the magnetometer readings are stable to within a predetermined stability threshold. This is done by comparing the present magnetometer data and two previous readings. If changes among the three quantities are larger than a preset threshold, the current data is discarded and new data enters the calculation queue.

A minimum-tilt-separation filter 306 is used to check for minimum tilt change of accelerometer data from step 301. Tilt is represented by both pitch and roll as its elements can be derived from acceleration direction vector measured by accelerometers 210. Current pitch and roll data are compared to last accepted data to determine whether a change is larger than a preset threshold. If the threshold is not exceeded, the current data is discarded and new data enters the calculation queue 301.

When the received data passes both stability filter 305 and minimum-tilt-separation filter 306, it is communicated to median filter 310. Median filter 310 returns the magnetometer and accelerometer data whose projection of one onto the other is the median of a group of the most recent projections. Median filter 310 operates by maintaining a first-in-first-out buffer sorted based on the projection of the acceleration vector to the magnetometer vector corrected according to equation (1); initially, the magnetometer data is corrected using default soft-iron and hard-iron parameters that assume no distortion, as illustrated in FIG. 4A; optionally, other assumptions and starting points may be used. As new data arrives, it shifts into a filter-buffer, which is initialized in such a way that the first data point received will eventually be output as the median. The filter-buffer is then sorted so that the middle row represents the median. The accelerometer and magnetometer data taken from this middle row serve as the output of median filter 310 and are submitted to the recursive least squares estimator 320. In an embodiment of this invention, a filter buffer size is selected as 9. This median filtering approach is very effective at removing spurious data. The data sets passing may be in random time intervals as long as they meet all filters requirements on a sequential basis. Once a data set is determined and logged, then the various filters are applied to each and every set of data points; the sets passing the filter's criteria generate an adequate map of the ellipsoid.

Based on updated input data after median filter 310, a recursive least squares estimator 320 performs an estimate of both soft-iron distortion matrix S and hard-iron offset vector H required to determine an undistorted Earth's magnetic field, as a combination of the previous estimate and new processed observations. This algorithm may adapt more or less quickly to a changing magnetic environment by way of an exponentially weighted "Forgetting Factor" of the algorithm. Setting a Forgetting Factor parameter close to 1.0 makes the algorithm resistant to signal noise by accepting new data less; setting it to 0.8 causes the algorithm to accept the new data more, and therefore causes the estimated parameters to be more susceptible to noise. In this way, the invented algorithm behaves similar to a typical least squares algorithm, and adapts to a slowly changing magnetic environment at a rate settable by a manufacturer or, optionally, a user.

A recursive least squares estimator 320 is applied to first-stage (325) and second-stage (326) estimation of soft-iron distortion and hard-iron offset. Each of the two stages of the algorithm is calculated using the two previous postulates. A more detailed description of a preferred two-stage algorithm follows.

Postulate 1) leads to an expression of the magnitude of Earth's magnetic field in terms of the measured magnetometer vector Bm.

$$(|Be|)^2 = [S \cdot (Bm-H)]^T \cdot [S \cdot (Bm-H)] = (Bm^T - H^T) \cdot S^T \cdot S \cdot (Bm-H) \quad (2)$$

The middle term may be expressed as a single 3×3 symmetrical matrix, C.

$$C = S^T S \quad (3)$$

Multiplying these terms out, the following quadratic equation is obtained.

$$(|Be|)^2 = Bm^T \cdot C \cdot Bm - 2Bm^T C \cdot H + H^T C \cdot H \quad (4)$$

At this stage, soft-iron matrix S is assumed to be upper triangular, $S_{ut}$, allowing for gain corrections relative to the X sensor, and orthogonalization of the X and Y sensors relative to the Z sensor. The lower left entries of S shall be filled out in the second-stage of the two-stage algorithm.

$$C = S_{ut}^T S_{ut} = \begin{pmatrix} 1 & C_{12} & C_{13} \\ C_{12} & C_{22} & C_{23} \\ C_{13} & C_{23} & C_{33} \end{pmatrix} \quad (5)$$

Assuming that measured magnetometer data Bm may be expressed as a 3×1 vector of $[Bm_x, Bm_y, Bm_z]^T$, we obtain the following:

$$(Bm_x \ Bm_y \ Bm_z) \cdot C \cdot \begin{pmatrix} Bm_x \\ Bm_y \\ Bm_z \end{pmatrix} - \quad (6)$$

$$2(Bm_x \ Bm_y \ Bm_z) \cdot C \cdot H + H^T CH = (|Be|)^2$$

With some algebraic manipulations, this equation is recast as the inner product of two vectors: a changing input vector u1(n) and an estimation parameter vector w1.

$$obs1(n) = Bm_x^2 = u1(n)^T \cdot w1 = \begin{pmatrix} -2Bm_xBm_y \\ -2Bm_xBm_z \\ -Bm_y^2 \\ -2Bm_yBm_z \\ -Bm_z^2 \\ 2Bm_x \\ 2Bm_y \\ 2Bm_z \\ 1 \end{pmatrix}^T \cdot \begin{pmatrix} C_{12} \\ C_{13} \\ C_{22} \\ C_{23} \\ C_{33} \\ L_x \\ L_y \\ L_z \\ H^TCH - (|Be|)^2 \end{pmatrix} \quad (7)$$

where $L = C \cdot H$.

A recursive least squares method is used for solving the above linear vector equation, from which good estimates of the parameter vector w1 and subsequently its elements $C_{12}$, $C_{13}$, $C_{22}$, $C_{23}$, $C_{33}$, $L_x$, $L_y$, and $L_z$ are derived. According to equation (5), matrix C is extracted. Then by taking a Cholesky decomposition mathematically, the upper triangular soft-iron distortion matrix $S_{ut}$ is calculated.

$$S_{ut} = chol(C) = chol\begin{pmatrix} 1 & C_{12} & C_{13} \\ C_{12} & C_{22} & C_{23} \\ C_{13} & C_{23} & C_{33} \end{pmatrix} = \begin{pmatrix} 1 & S_{12} & S_{13} \\ 0 & S_{22} & S_{23} \\ 0 & 0 & S_{33} \end{pmatrix} \quad (8)$$

The operation of Cholesky decomposition is done under the condition that matrix C is Positive Definite, meaning that it may be pre-multiplied and post-multiplied by any 3×3 vector to give rise to a positive scalar constant. In one embodiment of the invention, a built-in test for Positive Definiteness of matrix C in Cholesky decomposition function is used as per "Numerical Recipes in C++" by Press, Teukolsky, Vetterling, Flannery, 2003.

For compass calibration, the above conditions have been shown to be sufficient. In case this is not satisfied, the estimator 320 will discard current data and receive new data, which must pass all previous data filter tests to reach this point in the calibration.

A hard-iron offset vector H may be extracted by simply inverting the equation $L = CH$ $$H = C^{-1} \cdot L = \begin{pmatrix} 1 & C_{12} & C_{13} \\ C_{12} & C_{22} & C_{23} \\ C_{13} & C_{23} & C_{33} \end{pmatrix}^{-1} \cdot \begin{pmatrix} L_x \\ L_y \\ L_z \end{pmatrix} \quad (9)$$

Now a first-stage corrected geomagnetic field can be obtained out of first-stage estimator 325 according to equation (1).

$$Bc = S_{ut} \cdot (Bm - H) \quad (10)$$

An assumption of a soft-iron matrix being upper triangular as shown in equation (8) is a gross one. A Z-axis magnetic sensor may be skewed by soft-iron distortion, or an X-axis magnetic sensor may be gain mismatched, yet neither of these is accounted for so far in the upper triangular matrix. A refinement of the soft-iron matrix can be done by estimating a rotation matrix R that aligns the now orthogonal magnetometer coordinate system to the accelerometer coordinate system. In other words, a truly undistorted earth's magnetic field vector can be expressed as, $$Be = R \cdot Bc = R \cdot S_{ut} \cdot (Bm - H) \quad (11)$$

Based on Postulate 2, vector Be shall always make the same angle, A, to a gravitational acceleration direction vector, A, regardless of the orientation of a compass module. Similarly, the cosine of this angle, $\cos(\gamma)$, will be constant, and therefore a dot product between these two vectors will also be constant. If accelerometer vector A and first-stage corrected geomagnetic field vector Be are represented as 3×1 vectors, $$A = \begin{pmatrix} A_x \\ A_y \\ A_z \end{pmatrix} \text{ and } Be = R \cdot Bc = \begin{pmatrix} R_{11} & R_{12} & R_{13} \\ R_{21} & R_{22} & R_{23} \\ R_{31} & R_{32} & R_{33} \end{pmatrix} \cdot \begin{pmatrix} Bc_x \\ Bc_y \\ Bc_z \end{pmatrix}, \quad (12)$$

a dot product is expressed as follows, $$A^T \cdot Be = (A_x \ A_y \ A_z) \cdot \begin{pmatrix} R_{11} & R_{12} & R_{13} \\ R_{21} & R_{22} & R_{23} \\ R_{31} & R_{32} & R_{33} \end{pmatrix} \cdot \begin{pmatrix} Bc_x \\ Bc_y \\ Bc_z \end{pmatrix} = \text{constant.} \quad (13)$$

Dividing through by RI, and recasting equation (13) as the inner product of an input vector and a parameter vector, a scalar observation quantity may be expressed as a linear combination of a changing input vector, and an estimation parameter vector, that is assumed not to change.

$$obs2(n) = A_xBc_x = u2(n)^T \cdot w2 = \begin{pmatrix} -A_xBc_y \\ -A_xBc_z \\ -A_yBc_x \\ -A_yBc_y \\ -A_xBc_z \\ -A_zBc_x \\ -A_zBc_y \\ -A_zBc_z \\ 1 \end{pmatrix}^T \cdot \begin{pmatrix} R_{12}/R_{11} \\ R_{13}/R_{11} \\ R_{21}/R_{11} \\ R_{22}/R_{11} \\ R_{23}/R_{11} \\ R_{31}/R_{11} \\ R_{32}/R_{11} \\ R_{33}/R_{11} \\ A^T \cdot Be/R_{11} \end{pmatrix}. \quad (14)$$

Similar to the solution to equation (7), a recursive least squares method is used to solve equation (14) for estimates of parameter vector w2. The estimation accuracy improves as more and more data are received. The parameters in w2 may be used to construct a rotation matrix T as follows, $$T = \begin{pmatrix} 1 & R_{12}/R_{11} & R_{13}/R_{11} \\ R_{21}/R_{11} & R_{22}/R_{11} & R_{23}/R_{11} \\ R_{31}/R_{11} & R_{32}/R_{11} & R_{33}/R_{11} \end{pmatrix}. \quad (15)$$

Since the determinant of rotation matrix is always equal to one, then $$|T| = \frac{|R|}{R_{11}^3} = \frac{1}{R_{11}^3} \quad (16)$$

So only if the above determinant is positive, the estimate of $R_{11}$ may be calculated by $$R_{11} = \left(\frac{1}{|T|}\right)^{\frac{1}{3}}. \quad (17)$$

Now the rotation matrix R has been solved, $$R = R_{11} \cdot T, \quad (18)$$

which may be applied to calculate an estimate of the undistorted earth magnetic field out of second-stage estimator 326, according to equation (11) or (12).

At both auto-calibration stages, a recursive least squares estimator 320 is used to yield an evolving solution to the parameter vectors. A detailed process is now presented. At each time sample, there are six received data values from six different sensors: $Bm_x$, $Bm_y$, $Bm_z$ from magnetometers and $A_x$, $A_y$, $A_z$ from accelerometers. Various combinations of these quantities are used to synthesize an input vector u(n). For both stages, a desired signal or observation, obs(n), is tracked as a linear combination of the elements in the input vector u(n). This is done by iterating on the parameter vector w, which when multiplied by input vector u(n), is optimized in such a way that the sum of the squares of the errors between the estimates and the observations is minimized.

To begin a recursive least squares algorithm, a number of initializations are needed. Here it is initially assumed that the magnetic environment is free of both soft and hard iron distortion.

$$S = \begin{pmatrix} 1 & 0 & 0 \\ 0 & 1 & 0 \\ 0 & 0 & 1 \end{pmatrix} \quad H = \begin{pmatrix} 0 \\ 0 \\ 0 \end{pmatrix} \quad (19)$$

For a three-dimensional case, P is a 9×9 error covariance matrix. For both stages, it is initialized to be an identity matrix multiplied by some large number, for example, $10^5$.

To give a reasonable starting point for estimated parameter vectors, w1 and w2 may be initialized as follows.

$$w1 = \begin{pmatrix} 0 \\ 0 \\ 1 \\ 0 \\ 1 \\ 0 \\ 0 \\ 0 \\ 10^4 \end{pmatrix} \quad w2 = \begin{pmatrix} 0 \\ 0 \\ 0 \\ 1 \\ 0 \\ 0 \\ 0 \\ 1 \\ 50 \end{pmatrix} \quad (20)$$

Meanwhile, the changing input vectors and observations are defined in equations (7) and (14) for first-stage and second-stage algorithm, respectively.

In addition, an adjustable parameter, λ, exists in an algorithm to adjust a "Forgetting Factor" of a recursive least squares estimator. Setting λ close to 1.0 makes the algorithm behave very similar to a normal least squares algorithm, where all past data are equally considered. If it is set smaller, for example, to 0.5, the algorithm will adapt quickly to a changing environment, but will not be resistant to noise at all. A preferred value is selected based on a trade-off between resistance to noise in a given environment, and algorithm convergence speed.

At each time interval, as new updated input data arrives, the following calculations are performed:

Calculation of Kalman Gain:

$$k = \frac{P \cdot u(n)}{\lambda + u(n)^T \cdot P \cdot u(n)} \quad (21)$$

2) Calculation of a-priori error estimate $$\alpha = obs(n) - w(n)^T \cdot u(n) \quad (22)$$

3) Update of state vector estimate $$w(n) = w(n-1) + k \cdot \alpha \quad (23)$$

4) Update of an error covariance matrix $$P = \frac{1}{\lambda} \cdot (I_9 - k \cdot u(n)^T) \cdot P \quad (24)$$

$I_9$, in this case, is a 9×9 identity matrix.

When the algorithm is first starting out, it may well output nonsensical values for the state vector estimate, leading to imaginary numbers in the soft-iron distortion matrix. To prevent this, estimates of the soft-iron distortion and hard-iron offset are updated only when matrix C is tested to be Positive Definite in the first-stage process and when the determinant of matrix T is positive in the second stage process.

FIGS. 4A to 4E illustrate the details of the magnetic distortion correction operation procedures executed in each block of FIG. 3.

FIG. 4A shows initializations of a list of parameters required for data filtering processes and two-stage recursive least squares estimations of soft-iron distortion and hard-iron offset. This set of initialization values is for a compass with a triaxial accelerometer, or other gravity field strength sensor of 3-axis capability, and a triaxial magnetometer according to one embodiment of the invention. In this case, the error covariance matrix is a 9×9 matrix and the state vectors are 9×1 vectors. At the beginning, it is assumed that no soft-iron or hard-iron distortion is present so that S is a 3×3 identity matrix and H is a 3×1 vector with all elements set to zero; other initialization values may be used based on a known environment or a user's experience.

FIG. 4B illustrates the mathematical operation of the stability filter and minimum-tilt-separation filter for the received magnetometer data and the tilt deduced from accelerometer data, respectively.

FIG. 4C shows the detailed operation of the median filter using a first-in-first-out buffer. The data are organized and sorted based on a value, proj, or the projection of the acceleration vector A to the corrected magnetometer vector, evaluated using a present best guess of soft-iron matrix and hard-iron vector. As new data are received, the algorithm calls for shifting in a new row containing the new accelerometer data and magnetometer data plus proj at the first column. The rows are sorted based on this first column to create a sorted version of the same buffer. The median filter generates its output based on the middle row of this sorted buffer.

FIG. 4D presents a recursive least squares estimator 320 used in the instant invention magnetic distortion correction algorithm, illustrating an engine equation for deducing a state vector iteratively. FIG. 4D also shows how to use the magnetometer data to construct a first observation and a first input vector as per equation (7), setting the stage for the recursive least squares estimation. The resulting estimation of an upper-triangular soft-iron distortion matrix and a hard-iron offset vector leads to a determination of a first-stage corrected magnetic field.

FIG. 4E then shows a subsequent second stage correction, in which both updated accelerometer data and magnetometer data are used to construct a second observation and a second input vector as per equation (14). Again using a recursive least squares method to solve the equation iteratively leads to an estimation of a rotation matrix that provides a refined correction of the soft-iron distortion matrix. Finally, at the end of an algorithm loop, a best-estimated, undistorted earth's magnetic field is calculated, $$Be = S \cdot (Bm - H). \tag{25}$$

Figure 5:
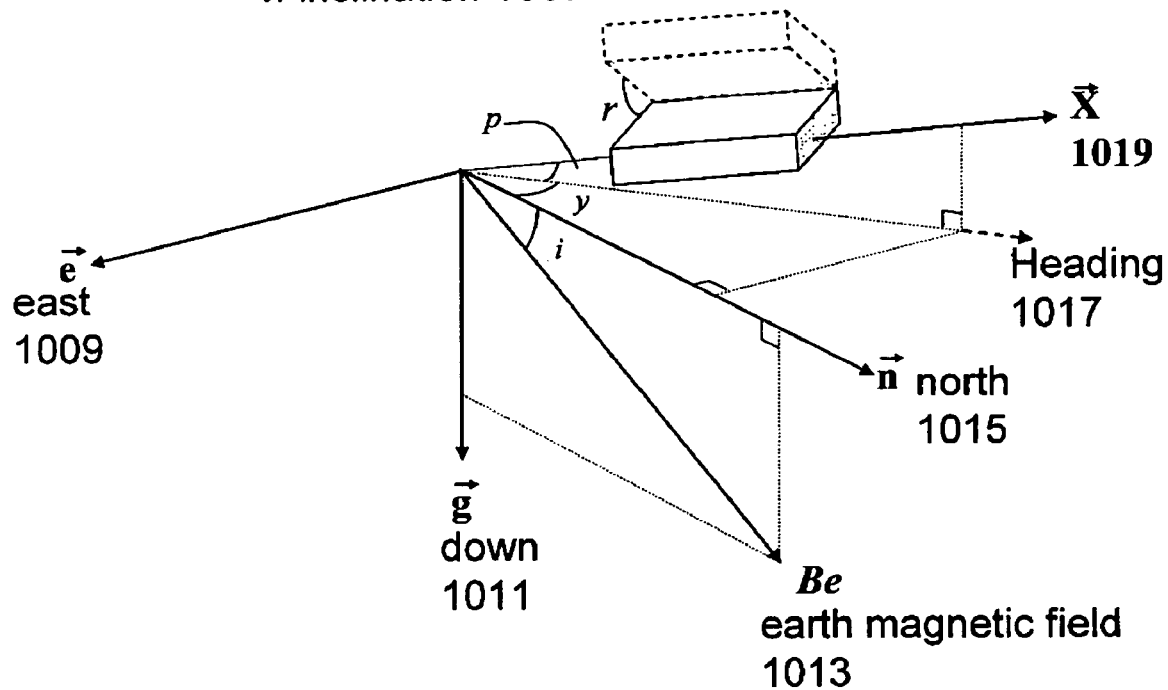
FIG. 5 shows earth's coordinate system with down $\vec{g}$, north $\vec{n}$ and east $\vec{e}$ vectors marked. A compass with an orientation $\vec{X}$ vector has a heading (yaw angle), y, relative to the north vector, with a pitch, p, and a roll, r, marked.
Figure 6A:
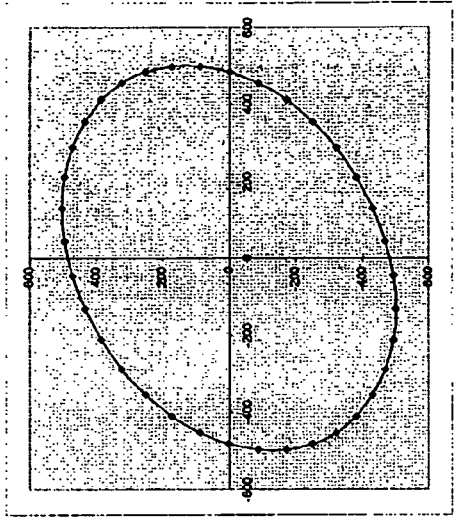
FIG. 6 A, B and C show schematically two dimensional measurement spaces for perfectly calibrated magnetometer and with hard-iron and soft-iron distortions.
Figure 6B:
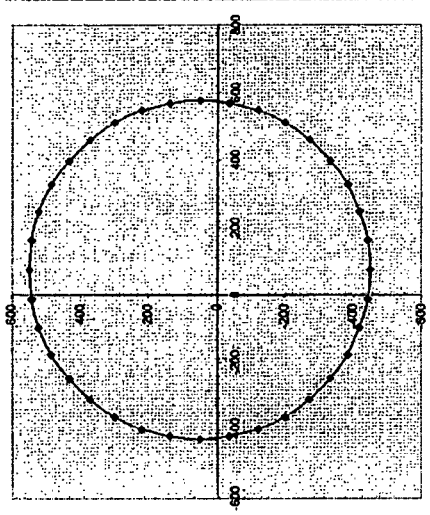
Figure 6C:
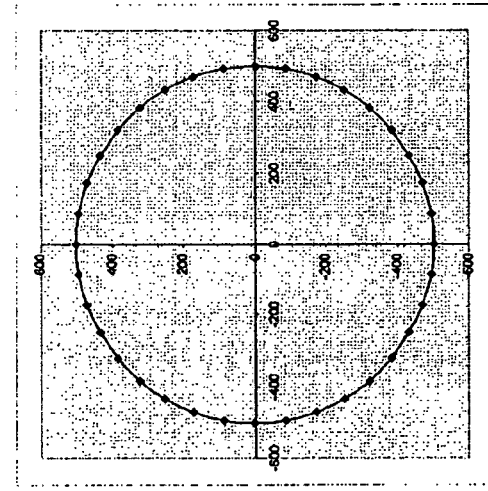

FIG. 5 illustrates the earth coordinate system with $\vec{g}$ as down direction 1011, $\vec{n}$ as north direction 1015, and $\vec{e}$ as east direction 1009. Be 1013 represents earth's magnetic field, often characterized by its magnitude, declination angle, and inclination angle i, 1007. As $\vec{g}$, Be, and $\vec{n}$ lie in the same plane, they will each be perpendicular to e Meanwhile, the North vector 1015 and east vector 1009 lie in the local horizontal plane, and are therefore perpendicular to the down direction 1011. A magnetic compass module body with an orientation vector $\vec{X}$ 1019 is shown within the coordinate system. The angle of the vector $\vec{X}$ 1019 relative to the horizontal plane is defined as the pitch angle p 1001. The compass module body may also rotate around axis $\vec{X}$ by a roll angle r. The projection of vector $\vec{X}$ 1019, onto the horizontal plane relative to the north direction 1015 $\vec{n}$ defines the yaw angle y 1005 or magnetic heading 1017.

Figure 7:
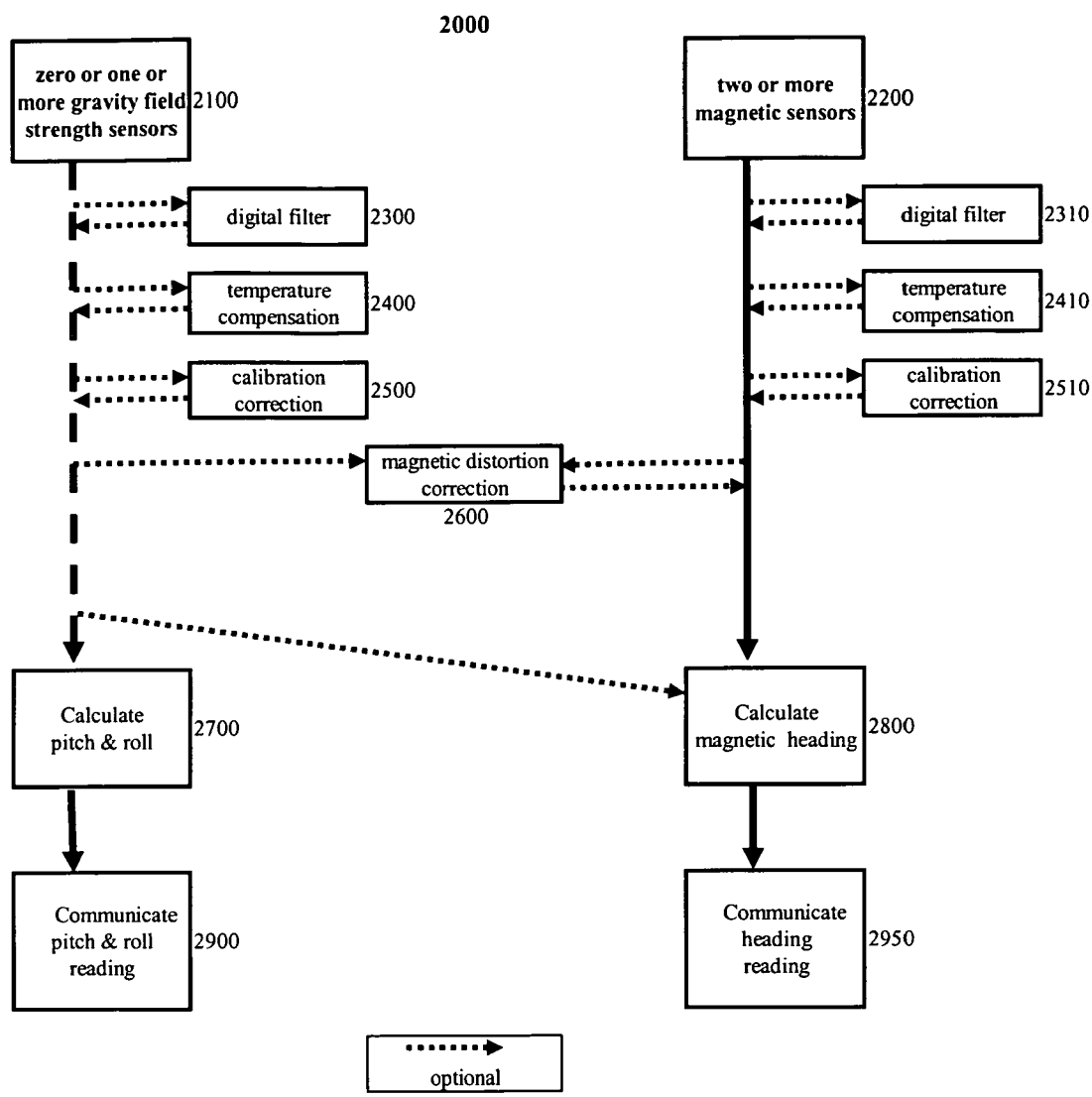
FIG. 7 is a functional block diagram of a low cost magnetic compass module with optional computing steps shown.

In an alternative embodiment, the instant invention is applied to two dimensional compasses employing two magnetometers and, optionally, zero, one or two accelerometers. Similar matrix techniques are used to model the soft and hard iron distortion in two dimensions, as well as a recursive least squares approach to iterating and improving on the model as more and more data are obtained. FIG. 7 shows a schematic flow diagram similar to FIG. 2 except that various computing steps are optionally included, noted by the dashed lines, based on cost and desired accuracy of a magnetic heading compass apparatus.

Method 2000 comprises at least two magnetic field strength sensors, such as magneto-inductive sensors and, optionally none, or one or more gravity field strength sensors, such as accelerometers. Data is acquired continuously in step 2100, and assuming there are gravity sensors present, in step 2200; acquisition time for a given data set comprising readings of at least two axes of magnetic and, optionally, at least one axis gravity field strength require less than a second and preferably less than 500 milliseconds. Optionally, digital filter 2300 and 2310 respectively for data from sensors 2100 and 2200, which processes the data to reduce the noise in the sensor readings; in one embodiment digital filters 2300 and 2310 are Finite-Impulse-Response (FIR) digital filters. Optionally, next a temperature compensation scheme 2400 or 2410 processes the data to reduce gain and offset drift with respect to temperature. Optionally, next in the block diagram, sensor data are submitted to calibration correction stage 2500 and 2510, in which, for example, magneto-inductive sensor data is processed with a least squares fitting function which estimates and corrects for any nonlinearity between magnetic sensor readings and applied magnetic fields as well as cross axis sensitivities using coefficients determined in a factory calibration procedure. Optionally, next a compass apparatus directly uses said accelerometer reading to conduct a pitch and roll calculation 2700 and yield pitch-roll reading 2900. The magnetometer reading however may correct a local soft-iron and hard-iron magnetic distortion through a magnetic distortion correction 2600 algorithm based on postulates 1) and 2). In one embodiment of an algorithm, both accelerometer readings and magnetometer readings are used to determine an undistorted earth's magnetic field vector. Based on measured accelerometer data and corrected magnetometer data, a heading calculation 2800 with tilt compensation is done, yielding a compass heading 2950. The highest accuracy is achieved by including all of the steps in the sequence indicated; alternative embodiments with lower accuracy are possible by eliminating one or more filters or algorithms or gravity field strength sensors while still retaining novel aspects of the instant invention.

The instant invention may be a subsystem in a more complex navigation system comprising GPS, sonar systems, laser signals, or other means known to one knowledgeable in the field. When a GPS apparatus is present the longitude and latitude data it provides may be combined with tables and/or algorithms to calculate the declination angle for that spot on the globe. Alternatively, one may know where one is on the globe either by past experience or reasonable approximation with a map or other means available to one knowledgeable in the art. However acquired, location data may be combined with similar matrix techniques to model a soft and hard iron distortion in two or three dimensions, as well as a recursive least squares approach to iterating and improving on the model as more and more magnetometer and, optionally, gravity-sensing data are obtained. The benefit is faster convergence, fewer data sets or points, to an accurate heading reading. In one embodiment, location data are inputted into a method or magnetic compass apparatus as a location code; a location code may comprise longitude and latitude data or other information which may be translated into useful information, such as magnetic declination angle, magnetic field strength, gravity field strength or heading computed by GPS; one or more types of location codes may be employed by the instant invention for a magnetic compass heading determination method or apparatus. A means for location determining comprises a map, a GPS, a table of magnetic declination angles, or magnetic field strengths, or gravity field strengths, or longitude and latitude data, all referenced by location.

In one low cost embodiment a method for determining a distortion corrected magnetic heading comprises acquiring a first set of data from two or more magnetometers within a predetermined time period in a first orientation; calculating a heading orientation from the first set of data wherein a multiplicity of first data sets are acquired in a multiplicity of yaw, or azimuth, orientations for the determining, such that the accuracy of the distortion correction improves with two or more first data sets acquired; and communicating a heading orientation. In another embodiment, location code data is acquired and processed in combination with said magnetometer data such that a somewhat more accurate distortion corrected magnetic heading is calculated. In another, more expensive embodiment, gravity field strength data from at least one gravity field strength sensor is acquired and processed in combination with magnetometer data such that a more accurate distortion corrected magnetic heading is determined by methods of the instant invention.

The foregoing described embodiments of the invention are provided as illustrations and descriptions. They are not intended to limit the invention to a precise form as described. In particular, it is contemplated that functional implementation of invention described herein may be implemented equivalently in hardware or various combinations of hardware and software and/or other available functional components or building blocks. Other variations and embodiments are possible in light of above teachings, and it is thus intended that the scope of invention not be limited by this Detailed Description, but rather by Claims following.

We claim:

1. A method for determining a distortion corrected magnetic heading comprising the steps:
    acquiring a first set of data from two or more magnetometers and a second set of data from one or more means for gravity field strength sensing within a predetermined time period in a first orientation;
    processing the first set of data with a first digital filter;
    processing the second set of data with a second digital filter;
    compensating the first set of data with a first temperature compensation algorithm;
    compensating the second set of data with a second temperature compensation algorithm;
    generating a first filtered signal by processing the first filtered set of data with a first nonlinear function whose coefficients are predetermined;
    generating a second filtered signal by processing the second filtered set of data with a second nonlinear function whose coefficients are predetermined; and
    calculating a heading orientation from the first and second filtered signals, wherein a multiplicity of the first and second data sets are acquired in a multiplicity of orientations for the determining, such that the accuracy of the distortion correction improves as additional first and second data sets are acquired and wherein the acquiring, the processing, the compensating, the generating, the calculating and the determining are continuously ongoing.

2. A method for determining a distortion corrected magnetic heading as in claim 1 further comprising the steps:
    calculating a pitch and roll orientation from said second filtered signal;
    generating a third data set by processing said first filtered signal and said second filtered signal;
    calculating a tilt compensated heading orientation from said third data set; and
    communicating the tilt compensated heading orientation and the pitch and roll orientation.

3. A method for determining a distortion corrected magnetic heading as in claim 1 wherein said multiplicity of first and second data sets and said multiplicity of orientations is at least five.

4. A method for determining a distortion corrected magnetic heading as in claim 1 wherein said predetermined time period is less than about one second.

5. A method for determining a distortion corrected magnetic heading comprising the steps:
    acquiring a first set of data from two or more magnetometers for magnetic field strength sensing and a second set of data from one or more means for gravity field strength sensing within a predetermined time period in a first orientation;
    generating a first filtered data set by processing the first set of data with a first digital filter, wherein the first digital filter comprises a Finite Impulse Response algorithm;
    generating a second filtered data set by processing the second set of data with a second digital filter, wherein the second digital filter comprises a Finite Impulse Response algorithm;
    compensating the first filtered data set with a first temperature compensation algorithm;
    compensating the second filtered data set with a second temperature compensation algorithm;
    calibrating the first set of data with a first nonlinear function whose coefficients are predetermined;
    calibrating the second set of data with a second nonlinear function whose coefficients are predetermined;
    generating a third set of magnetometer data from the calibrated first and second set of data; wherein the generating a third set of magnetometer data step comprises the steps:
        filtering said calibrated first set of data with a stability filter;
        filtering said calibrated second set of data with a minimum tilt separation filter;
        processing the filtered first and second set of data with a median filter with a first-in-first-out buffer to define the third set of data;
        processing the third set of data with a recursive least squares soft-iron and hard-iron offset estimator comprising a first stage estimator and a second stage estimator;
        wherein said first-stage estimator comprises calculating an upper-triangular soft-iron distortion matrix and a hard-iron offset vector to obtain a first-stage corrected geomagnetic field vector and wherein said second-stage estimator comprises calculating a rotation matrix to obtain a second stage corrected geomagnetic field vector;
    calculating a pitch and roll orientation from the calibrated second set of data;
    calculating a heading orientation from the calibrated second set of data and the third set of magnetometer data, wherein a multiplicity of first and second data sets are acquired in at least five orientations for the determining such that the accuracy of the distortion correction improves with two or more first and second data sets acquired; and
    communicating the magnetic heading and the pitch and roll orientation.

6. A method for determining a distortion corrected magnetic heading as in claim 5 wherein said communicating comprises an interface device comprising at least one from a group comprising visual display, visual touch display, optical fiber, electronic, audible, printed, telephonic, wireless and digital symbols.

7. A method for determining a distortion corrected magnetic heading as in claim 5 wherein said predetermined time period is less than about one second.

8. A method for determining a distortion corrected magnetic heading as in claim 5 wherein said two or more means for gravity field strength sensing are chosen from a group comprising gyroscopes, inclinometers and accelerometers.

9. A magnetic compass apparatus comprising:
    two or more magnetometer sensors;
    one or more means for gravity field strength sensing;
    a magnetic distortion correction algorithm;
    means for signal conditioning for the sensors wherein said means for signal conditioning comprises a finite-impulse-response digital filter with user-selective taps;
    means for processing; wherein the means for processing comprises at least one processor configured to apply a fitting function with parameters determined using least squares to correct a calibration setting for converting sensor data to gravity field strength readings and/or magnetometer readings: and wherein the means for processing comprises at least one processor configured to process received magnetometer data with a stability filter, to process received gravity field strength data using a minimum-tilt-separation filter, and to process magnetometer data and gravity field strength data using a median filter with a first-in-first-out buffer to define a third set of data; and wherein the means for processing comprises at least one processor configured to process the third set of data with a recursive least squares soft-iron and hard-iron offset estimator comprising a first stage estimator and a second stage estimator; and wherein said recursive least squares soft-iron and hard-iron offset estimator further comprises predetermined or user selectable initialization values;

means for information storage storing at least a portion of the magnetic distortion correction algorithm;

at least one temperature compensator wherein the at least one temperature compensator processes magnetic sensor data;

a means for starting and stopping a calibration procedure; and means for communicating.

10. The magnetic compass apparatus of claim 9, wherein said magnetometer sensors comprise magneto-inductive sensors.

11. The magnetic compass apparatus of claim 9, wherein said one or more means for gravity field strength sensing are chosen from a group comprising gyroscopes, inclinometers and accelerometers.

12. The magnetic compass apparatus of claim 9, wherein said means for information storage comprises at least one from a group comprising volatile semiconductor, non-volatile semiconductor and hard disk memory wherein at least one from a group comprising gravity field strength reading, magnetometer reading, one or more sets of calibration settings, one or more sets of calculated pitch, roll, and tilt-compensated heading readings, initialization values, filtering algorithm, location code and identity code are stored therein.

13. The magnetic compass apparatus of claim 9, wherein said means for communicating comprises at least one interface device chosen from a group comprising visual display, visual touch display, keyboard, signals via hard wire, Bluetooth™, video, voice, RF, optical fiber, telephonic, wireless and digital symbols.

14. The magnetic compass apparatus of claim 9, wherein said means for processing and said means for signal conditioning are one or more processors resident on one or more integrated circuit chips.

15. The magnetic compass apparatus of claim 9, wherein said means for processing and said means for signal conditioning comprise at least one software program.

16. The magnetic compass apparatus of claim 9, wherein said magnetometer sensors and said means for gravity field strength sensing may be sensing continuously.

* * * * *